Figure 1:
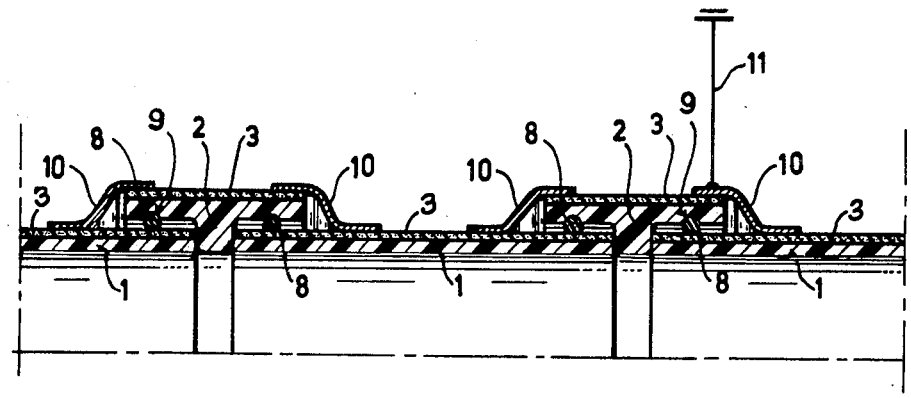

United States Patent [19]

de Putter

[11] 4,120,325

[45] Oct. 17, 1978

[54] ELECTRICALLY CONDUCTING PLASTIC PIPE SYSTEM

[75] Inventor: Warner Jan de Putter, Hardenberg, Netherlands

[73] Assignee: Wavin B.V., Zwolle, Netherlands

[21] Appl. No.: 647,242

[22] Filed: Jan. 7, 1976

Related U.S. Application Data

[62] Division of Ser. No. 447,582, Mar. 4, 1974, Pat. No. 3,943,273.

[51] Int. Cl.² ............................................. F16L 9/14
[52] U.S. Cl. ................................................. 138/145
[58] Field of Search ................... 285/45, 55, 231, 345, 285/DIG. 19, DIG. 24; 138/145, DIG. 6, 37; 174/73 R, 102 C

[56] References Cited

U.S. PATENT DOCUMENTS

| | | | |
|---|---|---|---|
| 1,867,984 | 7/1932 | Pistor | 138/145 |
| 2,798,509 | 7/1957 | Bergquist | 138/145 |
| 3,187,071 | 6/1965 | Radiejowski | 174/102.3 |
| 3,288,171 | 11/1966 | Hucks | 138/145 |

*Primary Examiner*—Robert I. Smith
*Attorney, Agent, or Firm*—Wilkinson, Mawhinney & Theibault

[57] ABSTRACT

A conducting plastic pipe system comprising a male plastic pipe part and a female plastic pipe part with conducting covering layers which are interconnected by means of a conducting sealing ring between the male and female part. In case of outer covering layers on the pipe part the covering layer extends onto the inner side of the muff end of the female pipe part.

1 Claim, 2 Drawing Figures

ELECTRICALLY CONDUCTING PLASTIC PIPE SYSTEM

This is a division of application Ser. No. 447,582 filed Mar. 4, 1974 and now U.S. Pat. No. 3,943,273.

The invention relates to a plastic pipe system with at least a first and second pipe, constituting a pipeline, and preferably a pipe system which comprises at least a male pipe part and a female pipe part and in addition a sealing member between the male part and the female part.

Such plastic pipe systems are commonly known. These systems have the drawback that when dry media, like air and air enriched with dust particles are transmitted through such plastic pipe systems electric charges accumulate on the inner and outer surfaces of the plastic pipe parts whereby the pipe system is statically charged. As a consequence there is little demand for such pipe systems manufactured from plastic when they should be employed at locations where at the static charges could give rise to explosions, like in shafts, etc.

Attempts have been made to overcome this trouble by wrapping with a conductive synthetic foil which is less statically charged, but in practice this could only be realized with difficulty, while moreover the foils used are easily damaged so that the desired effect gets lost.

It has also been suggested to spray an antistatic lacquer on the plastic pipe parts, these lacquers have in general no proper adhesion and moreover loose their properties in the course of time, while moreover when these antistatic lacquers are used two consecutive pipe parts on account of the presence of an insulating sealing member between the male pipe part and the female pipe part are interconnected in a non-conducting way.

For this purpose it is therefore requisite to ground each plastic pipe individually by means of supports on which the pipes are secured, which implies, however, all kind of difficulties. It is an object of the invention to provide a plastic pipe system which has not the aforementioned drawbacks.

According to the invention this object is attained by the arrangement that each plastic pipe part is provided on its inner and/or outer side with a continuous top coat which is fully connected with the surface of the pipe and which adheres thereto, while this coating of each plastic pipe may be directly or indirectly connected with means discharging the electric charge.

The plastic pipe parts consist preferably of polyvinylchloride, while the plastic coating consists of a thermosetting resin layer with carbon particles which is modified so as to be capable of adhering to a thermoplastic material like polyvinylchloride.

The pipe system comprises preferably a sealing member consisting of an elastic or plastic conductive material, which is disposed between two consecutive pipe parts, while the sealing member cooperates with top coats of consecutive pipe parts.

It has been found that by means of such plastic pipe systems all so far experienced difficulties can be obviated while moreover a single ground connection for the plastic pipe system at the desired location suffices.

According to a preferred and very advantageous embodiment the pipe system comprises a male pipe part and a female pipe part and a sealing member made of an elastomer with a quantity of carbon which ensures the electric conduction between the conductive top coat, cooperating with the sealing member, of the male pipe part and the top coat of the female pipe part. In this embodiment no provisions are required to connect the male pipe part in an electrically conducting way with the associated female pipe part, since the electric conduction between the top coats of the male pipe part and the female pipe part is achieved by means of a sealing member which preferably consists of a rubber ring which contains at least 10% and preferably about 20% of carbon particles.

In this case it is necessary that when an outer top coat is applied to the male pipe part and the female pipe part then this top coat is continued on the inner side of the socket end of the female pipe part where this part contacts the aforementioned sealing ring.

In an advantageous way a female pipe part with a socket formed thereon is used, while the top coat extends on the entire outer surface and on the inner side of the socket part of this plastic pipe part.

The invention relates also to a plastic pipe part adapted to be used in the plastic pipe system according to the invention and to a sealing member, particularly a member adapted to be used in a plastic pipe system according to the invention.

The invention is clarified with reference to the drawing showing an embodiment.

Figure 2:
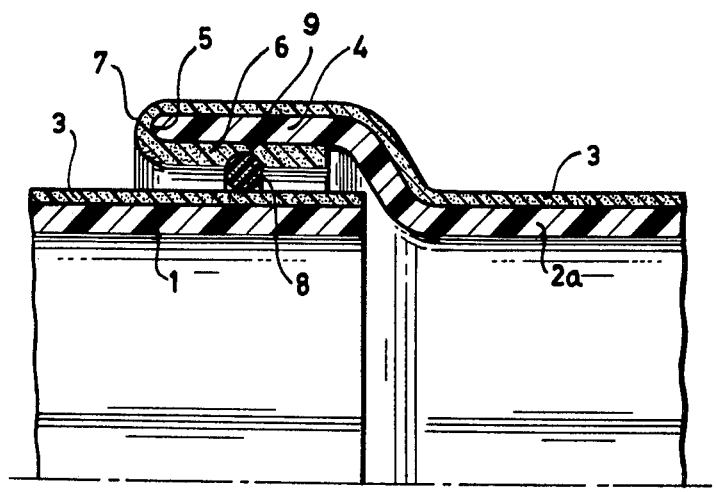

In the drawing:

FIG. 1 is a longitudinal cross-sectional view representing a plastic pipe system according to the invention wherein sockets are used as receiving pipe parts; and FIG. 2 is a longitudinal sectional view through a connection in a plastic pipe system according to the invention wherein female pipe parts with sockets formed thereon are used.

In FIG. 1 is represented a number of male pipe parts 1 of polyvinylchloride, which via female pipe parts 2 in the shape of plastic sockets made of polyvinylchloride are interconnected. Between each male pipe part 1 and each female pipe part 2 is a sealing member in the shape of a rubber ring 8.

On each male pipe part 1 and each female pipe part 2 is sprayed on the outer side thereof a top coat 3 consisting of metal e.g. aluminum, possibly in a liquid plastic composition which is compatible with respect to the polyvinylchloride and adheres to the polyvinylchloride. Especially a modified epoxy resin can be used.

In order to obtain an electric conduction between the surface coatings 3 on the male pipe parts 1 and the female pipe parts 2 in the shape of sockets thin metal strips 10 may be glued on the top coat surface 3 of the female pipe part 2 on the one hand and on the surface of the top coat 3 of the male pipe part 1 on the other hand. For this purpose aluminum foil may e.g. be used.

The top coat 3 consists of epoxy resin as stated hereinbefore which is modified in such a way that it adheres to the polyvinylchloride, or, of another thermoplastic material which is used for the plastic pipe parts. In order to apply the synthetic top coat a hardener and the desired quantity of soot particles and also an organic solvent are admixed to the modified epoxy resin, whereupon the mixture under a high pressure e.g. over 100 atmospheres is sprayed on the surface. It should be arranged for that no air inclusions appear in the top coat.

The whole pipe system is grounded by means of the ground connection 11.

Instead of the sockets 2a also plastic pipes 2 with a socket 4 formed thereon may be used, while pipes on their outer side are provided with the aforementioned conductive coating and the coating by its part 7 extends along the front side 5 of the socket end 4 and further on the inner side of the socket 4 while forming the coating 6 on the inner side.

On the other hand the male pipe part 1 of polyvinylchloride is likewise provided with the aforementioned top coat.

Between the female pipe part and the male pipe part is likewise disposed a sealing ring 8 partially accommodated in a groove 9, this sealing ring of elastomer material contains, however, a quantity of soot particles which suffices to ensure an electric conduction between the coating 3 of the male pipe part 1 and the part 6 of the coating on the socket part 4.

For this purpose this ring 8 of elastomer material contains at least 8% carbon particles and preferably at least 10% and particularly 20% carbon particles.

This quantity of soot particles is also suitable for a coating of modified epoxy resin with soot particles, (e.g. a Finch 453-1-1 modified epoxy resin of Finch, Paint and Chemical Division of Bostik CimbH, Obersurselts). The resin affixes itself particularly to polyvinylchloride.

The carbon particles applied consist of the commonly known soot particles of the type ensuring a proper electric conduction.

The soot used is ground and consists in general of a soot obtained when unsaturated compounds are burnt.

The carbon particles consist preferably of soot particles, particularly of soot particles obtained from acetylene.

It is obvious that also tensile stress resistant pipe connections can be established wherein the tensile strength ensuring means may serve as conducting means. For this purpose the means ensuring the tensile strength are provided with a coating comprising aluminum particles.

When a branch connection should be provided then an electricity conducting connection between the branch pipe and the main pipe should also be established.

Finally it should be noted that when a sleeve joint is formed, if pipe parts with an inner conducting coating are used, then the coating extending on the inner side of the male pipe should be continued at the end of a male pipe on the outer side thereof in order to obtain a conducting connection.

It is evident that instead of aluminum particles also other conductive particles can be incorporated into the coating.

What I claim is:

1. A polyvinylchloride pipe having an inner and outer surface characterized in that one of said surfaces is provided with a continuous coating layer of a thermosetting modified epoxy material which is fully connected with the surface of the pipe and adheres thereto, the thermosetting coating containing a quantity of sootlike conducting carbon particles so that the thermosetting coating layer is electrically conductive, the coating being connectible with means for discharging the electric charges.

* * * * *